(12) United States Patent
Benson et al.

(10) Patent No.: US 8,067,094 B2
(45) Date of Patent: Nov. 29, 2011

(54) FILMS INCLUDING THERMOPLASTIC SILICONE BLOCK COPOLYMERS

(75) Inventors: Karl E. Benson, St. Paul, MN (US); Richard G. Hansen, Mahtomedi, MN (US); Stephen A. Johnson, Woodbury, MN (US); Charles M. Leir, Falcon Heights, MN (US); Richard Y. Liu, Woodbury, MN (US); Mark D. Purgett, Oakdale, MN (US); Hildegard M. Schneider, Woodbury, MN (US); Audrey A. Sherman, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 869 days.

(21) Appl. No.: 11/614,357

(22) Filed: Dec. 21, 2006

(65) Prior Publication Data

US 2007/0177273 A1      Aug. 2, 2007

Related U.S. Application Data

(60) Provisional application No. 60/753,857, filed on Dec. 23, 2005.

(51) Int. Cl.
B32B 9/04      (2006.01)
(52) U.S. Cl. ............. 428/447; 428/448; 428/474.4; 428/475.2
(58) Field of Classification Search .............. None
See application file for complete search history.

(56) References Cited

U.S. PATENT DOCUMENTS

| | | | |
|---|---|---|---|
| 3,247,392 A | 4/1966 | Thelen | |
| 3,890,269 A | 6/1975 | Martin | |
| 4,119,615 A | 10/1978 | Schulze | |
| 4,249,011 A | 2/1981 | Wendling | |
| 4,374,237 A * | 2/1983 | Berger et al. | 528/28 |
| 4,661,577 A | 4/1987 | Jo Lane et al. | |
| 5,026,890 A | 6/1991 | Webb et al. | |
| 5,214,119 A | 5/1993 | Leir et al. | |
| 5,276,122 A | 1/1994 | Aoki et al. | |
| 5,290,615 A | 3/1994 | Tushaus et al. | |
| 5,360,659 A | 11/1994 | Arends et al. | |
| 5,437,813 A | 8/1995 | Akashi et al. | |
| 5,461,134 A | 10/1995 | Leir et al. | |
| 5,512,650 A | 4/1996 | Leir et al. | |
| 5,663,262 A | 9/1997 | Shirakawa et al. | |
| 5,814,711 A | 9/1998 | Choe et al. | |
| 5,825,542 A | 10/1998 | Cobb, Jr. et al. | |
| 5,825,543 A | 10/1998 | Ouderkirk et al. | |
| 5,828,488 A | 10/1998 | Ouderkirk et al. | |
| 5,837,804 A | 11/1998 | Yamagishi et al. | |
| 5,867,316 A | 2/1999 | Carlson et al. | |
| 5,882,774 A * | 3/1999 | Jonza et al. | 428/212 |
| 5,981,680 A | 11/1999 | Petroff et al. | |
| 6,025,897 A | 2/2000 | Weber et al. | |
| 6,045,894 A | 4/2000 | Jonza et al. | |
| 6,051,216 A | 4/2000 | Barr et al. | |
| 6,096,375 A | 8/2000 | Ouderkirk et al. | |
| 6,101,032 A | 8/2000 | Wortman et al. | |
| 6,340,404 B1 | 1/2002 | Oka et al. | |
| 6,352,761 B1 | 3/2002 | Hebrink et al. | |
| 6,355,759 B1 | 3/2002 | Sherman et al. | |
| 6,368,699 B1 | 4/2002 | Gilbert et al. | |
| 6,407,195 B2 | 6/2002 | Sherman et al. | |
| 6,441,118 B2 | 8/2002 | Sherman et al. | |
| 6,449,093 B2 * | 9/2002 | Hebrink et al. | 359/497 |
| 6,459,514 B2 * | 10/2002 | Gilbert et al. | 359/15 |
| 6,503,632 B1 * | 1/2003 | Hayashi et al. | 428/447 |
| 6,531,230 B1 | 3/2003 | Weber et al. | |
| 6,531,620 B2 | 3/2003 | Brader et al. | |
| 6,602,609 B1 | 8/2003 | Kong | |
| 6,664,359 B1 | 12/2003 | Kangas et al. | |
| 6,730,397 B2 | 5/2004 | Melancon et al. | |
| 6,783,349 B2 | 8/2004 | Neavin et al. | |
| 6,827,886 B2 | 12/2004 | Neavin et al. | |
| 6,846,893 B1 | 1/2005 | Sherman et al. | |
| 7,019,304 B2 | 3/2006 | Albagli et al. | |
| 7,052,762 B2 | 5/2006 | Hebrink et al. | |
| 7,501,184 B2 * | 3/2009 | Leir et al. | 428/448 |
| 2003/0165676 A1 | 9/2003 | Zhou et al. | |
| 2003/0175510 A1 | 9/2003 | Sherman et al. | |
| 2003/0194537 A1 | 10/2003 | Bhagwagar | |
| 2003/0235553 A1 | 12/2003 | Lu et al. | |
| 2004/0115153 A1 | 6/2004 | Yu | |
| 2004/0120912 A1 | 6/2004 | Yu | |
| 2005/0003208 A1 | 1/2005 | Graf | |
| 2005/0009985 A1 | 1/2005 | Selbertinger et al. | |
| 2007/0177272 A1 | 8/2007 | Benson et al. | |

FOREIGN PATENT DOCUMENTS

| | | |
|---|---|---|
| JP | 03-231812 | 10/1991 |
| JP | 5-229271 | * 9/1993 |
| JP | 08-269340 | 10/1996 |
| JP | 2006-225577 | 8/2006 |
| WO | WO2004/054523 | 7/2004 |

OTHER PUBLICATIONS

Machine translation of JP 5-229271.*
McGrath et al. "Synthesis and Characterization of Segmented Siloxane Copolymers", *Polymer Preprints*, vol. 39, No. 1, 1998, pp. 455-456.
U.S. Appl. No. 60/753,857, titled "Films Including Thermoplastic Silicone Block Copolymers", filed Dec. 23, 2005.
U.S. Appl. No. 60/753,791, titled "Multilayer Films Including Thermoplastic Silicone Block Copolymers", filed Dec. 23, 2005.
Extended European Search Report for European Application No. 06 84 8742, 8 pages.

* cited by examiner

*Primary Examiner* — Marc Zimmer (57) ABSTRACT

A composite film includes a first film and a second film contiguous to the first film. The first film includes a light transmissive material. In one embodiment, the second film includes a polydiorganosiloxane polyamide block copolymer. In another embodiment, the second film includes a polydiorganosiloxane polyoxamide block copolymer.

18 Claims, 2 Drawing Sheets

FILMS INCLUDING THERMOPLASTIC SILICONE BLOCK COPOLYMERS

CROSS REFERENCE TO RELATED APPLICATIONS

This application claims the benefit of U.S. Provisional Application Ser. No. 60/753,857, filed Dec. 23, 2005, which is incorporated herein by reference.

BACKGROUND OF THE INVENTION

Although films can have favorable optical and physical properties, one limitation of some films is that they can incur damage to their surfaces, such as scratching, denting and particle contamination, during manufacturing, handling, transport and use. Such defects, especially in films such as optical films, can render the films unusable or can necessitate their use only in combination with additional diffusers in order to hide the defects from the viewer. Protecting films from incurring damage and eliminating, reducing or hiding defects on optical films is particularly important in displays that are typically viewed at close distance for extended periods of time.

SUMMARY OF THE INVENTION

A composite film includes a first film and a second film contiguous to the first film. The first film includes a light transmissive material. In one embodiment, the second film includes a polydiorganosiloxane polyamide block copolymer. In another embodiment, the second film includes a polydiorganosiloxane polyoxamide block copolymer.

While the above-identified drawing figures set forth several exemplary embodiments of the invention, other embodiments are also contemplated. This disclosure presents illustrative embodiments of the present invention by way of representation and not limitation. Numerous other modifications and embodiments can be devised by those skilled in the art which fall within the scope and spirit of the principles of the present disclosure. The drawing figures are not drawn to scale.

Moreover, while embodiments and components are referred to by the designations "first," "second," "third," etc., it is to be understood that these descriptions are bestowed for convenience of reference and do not imply an order of preference. The designations are presented merely to distinguish between different embodiments for purposes of clarity.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

DETAILED DESCRIPTION

The present disclosure is directed to a composite film having a plurality of layers. A particularly suitable application of the composite film of the present disclosure is as an optical film. Some suitable applications are described in U.S. Pat. No. 6,531,230, entitled "Color shifting film," and U.S. Pat. No. 6,045,894, entitled "Clear to colored security film," which are hereby incorporated by reference.

Composite films of the present disclosure possess unexpectedly high delamination resistance. Moreover, in some exemplary embodiments they exhibit advantages of higher optical power, thinner construction, less color absorption or loss due to the reduced material volume in the thin film construction, and less UV-absorption compared to other films.

As used in this application:

"birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. For an oriented polymer layer, the x-axis is generally chosen to be the in-plane direction with the largest index of refraction, which typically corresponds to one of the directions in which the optical film is oriented (e.g., stretched);

"film" refers to one or more layers of one or more materials; a film may be disposed on a substrate and need not be capable of independent structural integrity; for example, coatings are considered to be films;

"high refractive index" and "low refractive index" are relative terms; when two layers are compared in at least one direction of interest, the layer that has a greater in-plane refractive index is the high refractive index layer, and the layer that has a lower in-plane refractive index is the low refractive index layer;

"index of refraction" refers to a refractive index of a material in the plane of the material with respect to light at 633 nm and normal incidence, unless otherwise indicated;

"polymer" means, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise; and "Tg" means the temperature at which a polymer transitions from a glassy to a rubbery state, as measured by differential scanning calorimetry.

Figure 1:
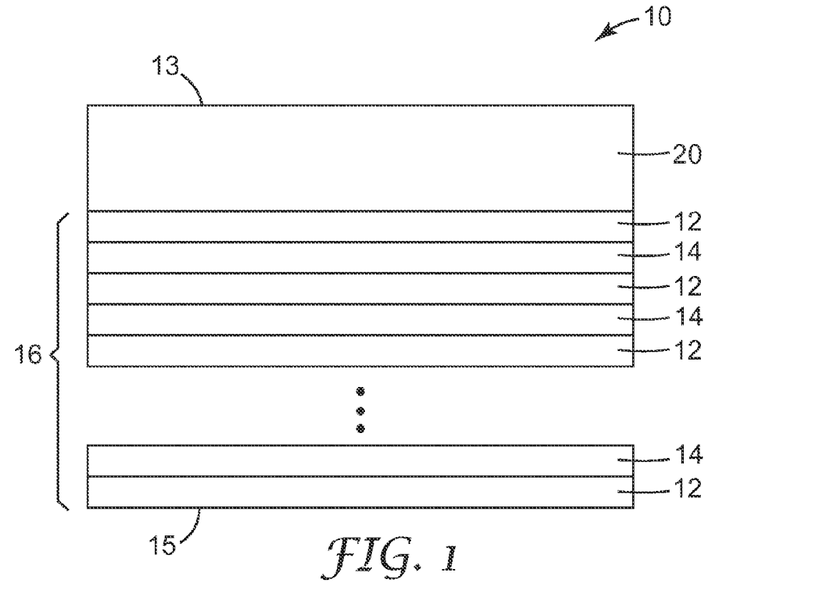
FIG. 1 shows one exemplary embodiment of a film including a skin layer.

An exemplary composite film 10 of the present disclosure as illustrated in FIG. 1 includes film 16 and skin layer 20. In one exemplary embodiment, film 16 includes a light transmissive material. In the illustrated embodiment, film 16 is a multilayer film having alternating layers 12, 14 of at least two materials. In one embodiment, the materials of layers 12 and 14 are polymeric. Composite film 10 includes first major surface 13 and second major surface 15. In general, U.S. Pat. No. 6,827,886, entitled "Method for making composite optical films," hereby incorporated by reference, describes methods that can be adapted for making composite film 10. In one embodiment, film 16 is a multilayer film as described in U.S. patent application Ser. No. 60/753,791, filed on Dec. 23, 2005, and filed on the same day as the present application, incorporated herein by reference in their entirety. Other film structures are disclosed in U.S. Pat. Nos. 5,360,659 and 3,247,392, hereby incorporated by reference. Though film 16 is illustrated and described as a multilayer film in FIG. 1, in another embodiment, film 16 is a monolithic film. In addition, although film 16 is illustrated as having planar surfaces, at least one surface of the film 16 may be structured. If the composite film 10 includes a structured major surface, the skin layer 20 may be applied or otherwise disposed on a major surface opposite the structured surface.

In one embodiment, film 16 is an optical film. Film 16 can be a single layer of a suitable optically clear material such as polycarbonate, which may or may not include volume diffusers. Those of ordinary skill in the art will readily appreciate that the structures, methods, and techniques described herein can be adapted and applied to other types of suitable films. The optical films specifically mentioned herein are merely illustrative examples and are not meant to be an exhaustive list of films suitable for use with exemplary embodiments of the present disclosure.

Exemplary optical films that are suitable for use in the present disclosure include composite reflective films such as those described in, for example, U.S. Pat. Nos. 5,882,774 and 6,352,761 and in PCT Publications No. WO95/17303; WO95/17691; WO95/17692; WO95/17699; WO96/19347; and WO99/36262, all of which are incorporated herein by reference. Both multilayer reflective optical films (e.g., mirrors and polarizers) and continuous/disperse phase reflective optical films rely on index of refraction differences between at least two different materials (typically polymers) to selectively reflect light of at least one polarization orientation. Suitable diffuse reflective polarizers including a continuous phase and a disperse phase disposed within the continuous phase are described in, for example, U.S. Pat. No. 5,825,543, incorporated herein by reference, and in, for example, U.S. Pat. No. 5,867,316, incorporated herein by reference.

In optical film applications, by stretching composite film 10 over a range of uniaxial to biaxial orientations, films can be created with a range of reflectivities for differently oriented plane-polarized incident light. "Oriented direction" is the direction in which the film is stretched. "Transverse direction" is the direction in the plane of the film orthogonal to the direction in which the film is oriented.

Composite film 10 includes two or more layers, and each layer can be made from any of a number of different materials. The characteristics which determine the choice of materials for a particular stack depend upon the desired performance of composite film 10. Composite film 10 can contain as many materials as there are layers in the stack. However, for ease of illustration, exemplary embodiments of composite film 10 show only a few different materials. In one embodiment, the materials of composite film 10 have compatible thermal processing ranges and similar rheological properties (for example, melt viscosities) such that they can be co-extruded. Moreover, in one embodiment, the number of layers in composite film 10 is selected to achieve the desired properties using the minimum number of layers for reasons of film thickness, flexibility and economy.

The boundaries between the different materials, or between chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Materials suitable for making films 16 for use in exemplary embodiments of the present disclosure include polymers such as, for example, polyesters, copolyesters and modified copolyesters. Polyesters suitable for use in some exemplary optical films according to the present disclosure generally include carboxylate and glycol subunits and can be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Some exemplary materials for film 16 are crystalline, semicrystalline, amorphous or liquid crystalline materials, including polymers, such as polyolefins. Other exemplary materials include inorganic materials. Specific examples of suitable materials for film 16 include polymethyl methacrylate (PMMA), polyalkylene naphthalates (e.g., PEN(polyethylene naphthalate), PPN(polypropylene naphthalate), PBN(polybutylene naphthalate), and PCN(poly-1,4-cyclohexanedimethylene naphthalate), PHN (polyhexamethylenenaphthalate)) and isomers thereof (e.g., 2,6-, 1,4-, 1,5-, 2,7-, and 2,3-PEN), polyalkylene terephthalates (e.g., PET(polyethylene terephthalate), PPT(polypropylene terephthalate), PBT(polybutylene terephthalate), and PCT(poly-1,4-cyclohexanedimethylene terephthalate), PHT (polyhexamethyleneterephthalate)), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), polysulfones, polyethersulfones, polyacrylonitrile, polyamides, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN, PBN, PPN, PCN, PHN, PET, PBT, PPT, PCT, PHT (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a coPEN. In one embodiment of the present disclosure, two or more of these materials are used in alternating layers, such as layers 12, 14 of FIG. 1.

In one exemplary embodiment of the present disclosure, the low refractive index material for layer 14 or skin layer 20 is a thermoplastic polydiorganosiloxane polyamide block copolymer (where the polyamide component may be ethylene terephthalamide, hexamethylene adipamide, butylene sebacamide, or any other known polyamide). In one embodiment of the present disclosure, the material for layer 14 or skin layer 20 is a polydiorganosiloxane polyoxamide block copolymer, further described in U.S. patent application Ser. No. 11/317,271, filed on Dec. 23, 2005, incorporated herein by reference in its entirety. The polydiorganosiloxane polyoxamide block copolymers have a plurality of oxalylamino and aminoxalylamino groups (e.g., the oxalylamino groups can be part of the aminoxalylamino groups). The polydiorganosiloxane polyoxamide copolymers can contain a relatively large fraction of the polydiorganosiloxane segment compared to many known polydiorganosiloxane polyamide copolymers. The polydiorganosiloxane polyoxamide copolymer can usually be subjected to elevated temperatures up to 250° C. or higher without apparent degradation.

In one embodiment, a copolymeric material is provided that contains at least two repeat units of Formula I.

from about 1 percent to about 10 percent are especially suitable because they are thermoplastic elastomers: solid under ambient conditions, yet able to soften or flow at elevated temperatures. Herein, the term "hard segment" refers to organic amide blocks and terminal groups. The polyamine residue is the polyamine minus the —$NHR^3$ groups. The polydiorganosiloxane residue is connected to the polyamine residue by amide linkages.

Desirable material properties of polydiorganosiloxane polyamide block copolymers for use in skin layer 20 include, for example: (1) isotropic or negative birefringence, (2) thermal stability (stable to at least about 250 degrees C. for about 1 hour), (3) processing temperatures compatible with those of many polymers of film 16 (from about room temperature to about 300 degrees C., assuming the viscosity has been tailored appropriately), (4) UV stability or protectability, (5) high clarity (e.g., high transmission and low absorption over wavelengths of interest), (6) low Tg (in this case, −120 degrees C.), (7) viscosities that facilitate viscosity matching with many polymers of film 16, to ensure co-extrusion and flow stability, (8) good interlayer adhesion with film 16, (9) low optical dispersion, (10) good z-index matching with film In this formula, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Group G is a divalent group that is the residue unit that is equal to a diamine of formula $R^3HN-G-NHR^3$ minus the two —$NHR^3$ groups (i.e., amino groups) where $R^3$ is hydrogen, alkyl, or forms a heterocyclic group when taken together with G and with the nitrogen to which it is attached. Each group B is independently a covalent bond, an alkylene of 4-20 carbons, an aralkylene, an arylene, or a combination thereof. When each group B is a covalent bond, the polydiorganosiloxane polyamide block copolymer of Formula I is referred to as a polydiorganosiloxane polyoxamide block copolymer. Each asterisk indicates the position of attachment of the repeating unit to another group such as another repeat unit.

Such polydiorganosiloxane polyamide block copolymers are thermally stable over a wide range of processing temperatures and can also be prepared with a wide range of viscosities. For optical applications, exemplary polydiorganosiloxane polyoxamide block copolymers have a refractive index of about 1.41 at 633 nm.

Polydiorganosiloxane polyamide block copolymers demonstrate high levels of adhesion to many coextruded polymers. Moreover, they are highly extensible or drawable in that they can be stretched to high levels without significant degradation of or change in their optical properties. For each application, a suitable polydiorganosiloxane polyamide block copolymer is selected to be paired with the selected high refractive index material, taking into account compatibility properties such as melt viscosity, thermal stability, and adhesion, especially during the length orientation and/or tentering operations required for processing. Polydiorganosiloxane polyamide block copolymers with hard segment contents

16, (11) drawability (e.g., the ability to be oriented without birefringence), and (12) scratch and abrasion resistance.

Since polydiorganosiloxane polyamide block copolymers can be made with a range of refractive indices, it will be understood that a polydiorganosiloxane polyamide block copolymer having a relatively high refractive index, and meeting all other requirements set forth herein for a high refractive index layer polymer, could serve as the material of high refractive index layer 12.

Delamination of the interphase between polymer layers 16, 20 in composite films 10 is usually predictable using knowledge of polymer interactions. The polymer interaction can be calculated using polymer solubility parameters as disclosed in the literature. The method involves calculating the cohesive properties of a given pair of polymers which is called cohesive energy, $E_{co}$.

One can calculate the cohesive energy of a given polymer using its repeating unit via the group contribution method of Fedors.

$$E_{co} = \sum_i E_{o,i} \cdot n \left(\frac{J}{mol}\right) \text{cohesive energy} \quad (1)$$

where $E_{o,i}$ and n are the molar cohesive energy and number for each functional group in the repeating unit of a polymer, respectively.

Coupling with the molar volume, V, as calculated by the same group contribution method shown as follows, $$V = \sum_i V_i \cdot n \left(\frac{cm^3}{mol}\right) \text{molar volume} \quad (2)$$

where $V_i$ is the molar volume for individual functional group in the repeating unit.

One can calculate the solubility parameter, δ, for the given polymers, $$\delta = \left(\frac{E_{co}}{V}\right)^{0.5} \left(\frac{J}{cm^3}\right)^{0.5} \text{solubility parameter} \quad (3)$$

From the solubility parameters of two polymers, one can calculate the Flory-Huggins interaction parameter of these two polymers, $$\chi = \frac{V_{ref}}{RT}(\delta_1 - \delta_2)^2 \text{ interaction parameter} \quad (4)$$

where $V_{ref}$ is the reference volume; R is the gas constant; T is the temperature in K.

Ideally, a miscible polymer pair would have identical solubility parameters, resulting in a value for χ that is very close to zero. On the contrary, if two polymers have very different solubilities, the interaction parameter will be significantly larger than zero. By comparing the interaction parameters of different polymer pairs, one can generally predict the theoretical strength of polymer interactions.

From the theoretical calculation, composite films 10 having polydiorganosiloxane polyoxamide block copolymers in skin layer 20 paired with polyesters such as PET or PEN in film 16 have higher interaction parameters (~2.2) than other polymer pairs. This indicates theoretically that composite films 10 will possess a thin interphase between the materials. Accordingly, one would expect that such composite films 10 would tend to exhibit weak interlayer adhesion and therefore be subject to delamination.

However, in practice, cast and oriented composite films 10 of the present disclosure have exhibited unexpectedly high interlayer adhesion values and delamination resistance that do not conform to the theoretical predictions. In one example, films of 3-layer construction were produced using a pilot scale coextrusion line. The extrusion temperatures depend on the viscosity of the materials. A processing temperature of about 530° F. (277° C.) was chosen for PET, PMMA and the polydiorganosiloxane polyoxamide block copolymer. Due to its higher melting point, PEN was extruded at 540° F. (282° C.). The die and feedblock were run at 530° F. (277° C.) for PET and 540° F. (282° C.) for PEN. The 6 inch (15.2 cm) wide extrudate was quenched on a chill roll and 30 mil (0.76 mm) cast web was collected. The delamination strength in g/in was tested using a 90° Peel Delamination Test Method described in the test method section. In one example, a cast three-layer film 10 having polydiorganosiloxane polyoxamide block copolymers in layer 20 and PET in layer 16 exhibited an average delamination strength of about 1280 g/in. In comparison, a cast three-layer film having PMMA and PEN exhibited an average delamination strength of about 18 g/in.

In another sample, 3-layer cast webs were subsequently stretched in a biaxial stretcher (KARO IV, a commercially available instrument made by Bruckner of Siegsdorf, Germany). The stretching temperature was 130° C. for the PEN/PMMA cast web and 95° C. for PET/polydiorganosiloxane polyoxamide block copolymer cast web. The draw ratio was 3×3 and draw speed was 100-150%/sec for both systems. The delamination strength in g/in was tested using a 90° Peel Delamination Test Method described in the test method section. An oriented (stretched) three-layer film 10 having polydiorganosiloxane polyoxamide block copolymers in layer 20 and PET in layer 16 exhibited an average delamination strength of about 100 g/in. In comparison, an oriented (stretched) three-layer film having PMMA and PEN exhibited an average delamination strength of about 30 g/in.

Although the applicants do not wish to be bound by any particular theory, one possible explanation is that while the size of an interphase is dominated by interaction parameters, adhesion measurements are a complicated combination of several types of forces. One contributor to the measured adhesion force is the chemical bond or interaction that occurs between molecules. Included would be covalent bonds, hydrogen bonding, and van der Waals forces, for example. In the case of rather inert, low index resins, one would expect this contribution to be small. A second contributor is physical: for example, entanglements—which relate to miscibility.

A third contributor to the adhesion force between the composites is the dissipation of energy during the peel or interfacial fracture. See U.S. Patent Pub. No. 2003-0072931-A1, entitled "Low Tg Composite Optical Films," which is hereby incorporated by reference. The more energy a system can dissipate during the failure, the higher the peel force. In the case of these low index resins, the viscoelastic nature of the polymers is important. The Tg of the polydiorganosiloxane segment of the polydiorganosiloxane polyamide block copolymers (−120° C.) is lower than that of other low index resins such as PMMA (110° C.). The very low Tg shifts the ductile/brittle transition to lower temperatures. Thus, the polydiorganosiloxane polyamide block copolymers are prone to viscoelastic deformation rather than brittle fracture upon external impact. This results in improved properties such as high tear, puncture, delamination, imprint and impact resistance.

Additionally, polydiorganosiloxane polyoxamide block copolymers go through a thermal transition at temperatures of concern in extrusion and heat set. Initially out of an extruder, the polydiorganosiloxane polyoxamide block copolymers demonstrate a high adhesion value with other polymers which drops somewhat when stretched at 90° C. It is possible that such stretching occurs at temperatures where the phase separated hard segments (amide-sections) are not mobile, inducing some strain. However, as shown in TABLE 1, heat setting at higher temperatures allows for annealing or dissipation of strain, again leading to higher delamination forces. Additionally, while the amide content is very low, there is some possible hydrogen bonding between the amide bonds and the end groups and potentially ester links of polymers such as PET; this hydrogen bonding weakly contributes to higher adhesion force. The term "hydrogen bonding" refers to an electrostatic interaction of hydrogen of a highly polarized bond (e.g., O—H or N—H) and a lone pair of electrons of a small electronegative atom (e.g., fluorine, oxygen, or nitrogen) in a neighboring molecule or in another functional group. Optimization of these interactions occurs where temperature (mobility) allows these groups to associate with one another. In one example, the 3-layer PET-based oriented composite films 10 were heat set at elevated temperature for a period of time to improve the dimensional stability. The delamination strength in g/in was tested using a 90° Peel Delamination Test Method described in the test method section. The delamination results at different heat set temperatures and times for oriented PET and polydiorganosiloxane polyoxamide block copolymer composite films 10 are summarized in the following Table:

TABLE 1

Delamination of heat set film of PET and polydiorganosiloxane polyoxamide block copolymer

| Heat set temp | Heat set time | Delamination (g/in) |
|---|---|---|
| 95° C. | 10 sec | 193 |
| 95° C. | 30 sec | 235 |
| 95° C. | 60 sec | 183 |
| 105° C. | 10 sec | 176 |
| 105° C. | 30 sec | 155 |
| 105° C. | 60 sec | 300 |
| 115° C. | 10 sec | 303 |
| 115° C. | 30 sec | 399 |
| 115° C. | 60 sec | 320 |

When used as an optical film, composite film 10 is typically thin. Suitable films have varying thicknesses, but in exemplary embodiments, they have thicknesses of less than about 15 mils (about 380 micrometers), more typically less than about 10 mils (about 250 micrometers), and preferably less than about 7 mils (about 180 micrometers). Depending on the application, suitable composite films 10 may be as thin as about 0.5 mil (about 12.7 micrometers) or thinner or as thick as about 15 mils (about 381 micrometers) or thicker. An optical film also normally undergoes various bending and rolling steps during processing, and therefore, in exemplary embodiments of the present disclosure, composite film 10 is preferably flexible.

The ability to achieve the desired relationships among the various indices of refraction (and thus the optical properties of composite film 10) is influenced by the processing conditions used to prepare composite film 10. In the case of organic polymers which can be oriented by stretching, the films are generally prepared by co-extruding the individual polymers to form composite film 10 and then orienting film 10 by stretching at a selected temperature, optionally followed by heat-setting at a selected temperature. Alternatively, the extrusion and orientation steps may be performed simultaneously. In the case of polarizers, film 10 is stretched substantially in one direction (uniaxial orientation), while in the case of mirror films, film 10 is stretched substantially in two directions (biaxial orientation).

In different processing embodiments, composite film 10 may be allowed to dimensionally relax in a cross-stretch direction, resulting in a natural reduction in cross-stretch (equal to the square root of the stretch ratio); composite film 10 may be constrained to limit any substantial change in cross-stretch dimension; or composite film 10 may be actively stretched in a cross-stretch dimension. For example, composite film 10 may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a composite film 10 having the desired refractive index relationship and physical dimensions. These variables are interdependent; thus, for example, a relatively low stretch rate could be used if coupled with, for example, a relatively low stretch temperature. In general, a stretch ratio in the range from about 1:2 to about 1:10 (more preferably about 1:3 to about 1:7) in the stretch direction and from about 1:0.2 to about 1:10 (more preferably from about 1:0.5 to about 1:7) orthogonal to the stretch direction is selected in an exemplary embodiment.

Suitable composite films 10 may also be prepared using techniques such as spin coating (e.g., as described in Boese et al., J. Polym. Sci.: Part B, 30:1321 (1992) for birefringent polyimides) and vacuum deposition (e.g., as described by Zang et. al., Appl. Phys. Letters, 59:823 (1991) for crystalline organic compounds); the latter technique is particularly useful for certain combinations of crystalline organic compounds and inorganic materials.

Figure 2:
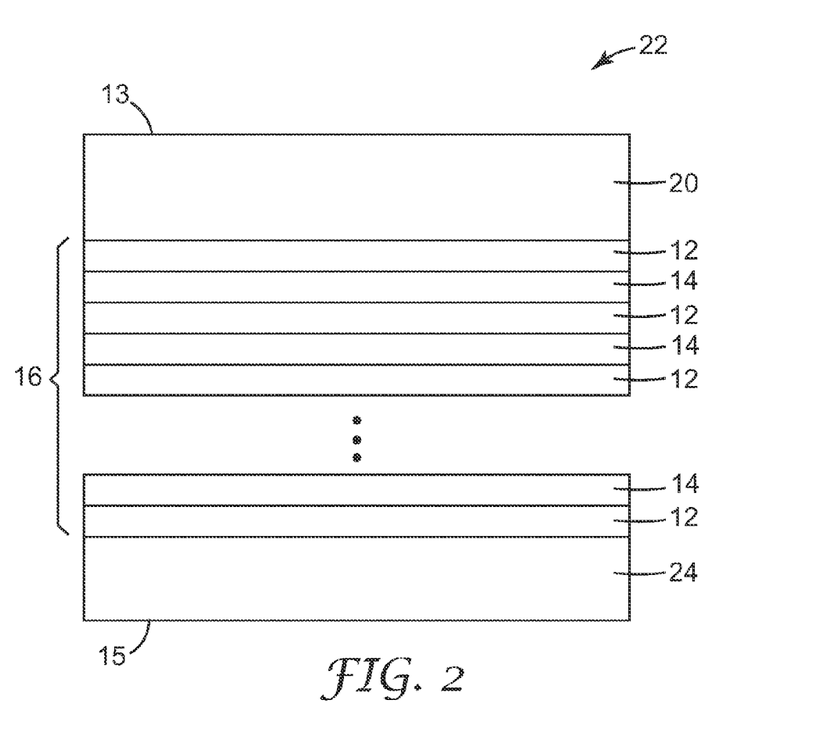
FIG. 2 shows a second exemplary embodiment of a film including two skin layers.

In other exemplary embodiments, composite films 10 may be prepared by laminating the one or more skin layers 20, 24 to the film 16, coextruding the one or more skin layers 20, 24 with the film 16 or by coating the one or more skin layers 20, 24 onto the film 16.

Figure 3:
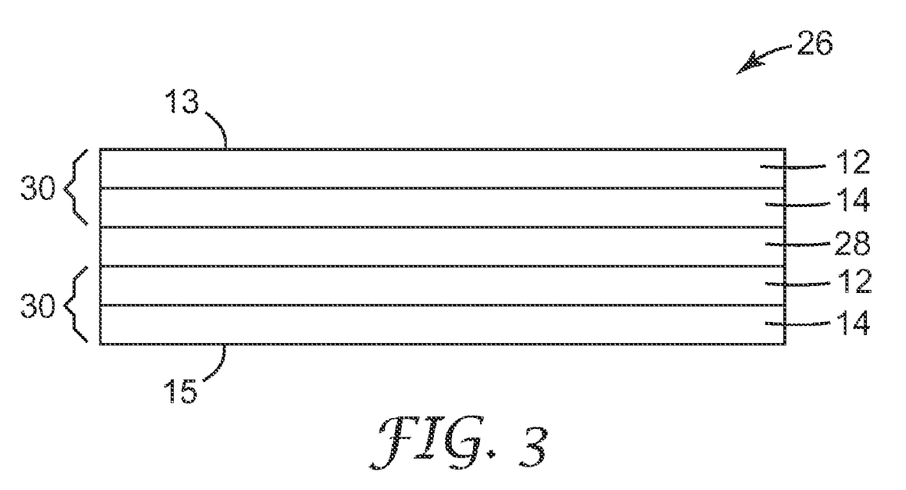
FIG. 3 shows a third exemplary embodiment of a film including an internal layer of different material.

The appearance and/or performance of film 16 may be altered by including additional layers such as a skin layer on a major surface; an underskin layer contiguous with a skin layer; or an internal or protective boundary layer (PBL) within the stack of film layers to form composite film 10. As previously described, FIG. 1 shows composite film 10 having a single skin layer 20. FIG. 2 shows composite film 22 having two skin layers 20, 24. Referring to FIG. 1, composite film 22 of FIG. 2 is similar to composite film 10 of FIG. 1 with the addition of skin layer 24 on second major surface 15. FIG. 3 shows composite film 26 having internal layer 28 between film layers 30. In some exemplary embodiments, one or more layers 20, 24, 28 comprise the polydiorganosiloxane polyamide block copolymers discussed above.

The thickness of each layer of composite film 10, 22, 26, as well as the number of layers, can be varied to make a composite film 10, 22, 26 having a particular desired thickness and performance characteristics. Moreover, in applications of composite films 10, 22, 26 as optical films, such additional layers 20, 24, 28, should not unduly compromise the optical properties required for the application to which the composite films 10, 22, 26 are directed.

Skin layers 20, 24 and interior layer 28 may be integrated at the time of film formation, either by coextrusion or in a separate coating or extrusion step, or they may be applied to the finished film 16, 30 at a later time, such as by coating or lamination of skin layer 20, 24 to a previously formed film 16, 30. Total additional layer 20, 24, 28 thicknesses typically range from about 2% to about 50% of the total thickness of composite film 10, 22, 26.

In one embodiment, polydiorganosiloxane polyamide block copolymers are used in one or more additional layers 20, 24, 28. In one example, the polydiorganosiloxane polyamide block copolymers serve as receptors for additives to enhance the performance of, or impart other desired characteristics to, composite films 10, 22, 26. Polydiorganosiloxane polyamide block copolymers are particularly good receptors for non-polar, low molecular weight materials. Examples of exemplary additives are described in U.S. Pat. Nos. 6,368, 699, and 6,459,514 both entitled "Composite Polymer Film with Additional Coatings or Layers," both of which are incorporated herein by reference, and U.S. Pat. No. 6,783,349 to Neavin et al., entitled "Apparatus for Making Multilayer Optical Films," incorporated herein by reference. A non-limiting discussion of additives that may be combined with polydiorganosiloxane polyxamide block copolymers n one or more of the additional layers 20, 24, 28 is described in more detail in the following examples.

The composition of additional layers 20, 24, 28 may be chosen, for example, to protect the integrity of films 16, 30 during or after processing, to add mechanical or physical properties to composite film 10, 22, 26; or to add optical functionality to composite film 10, 22, 26. Functional components such as antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners may be included in these layers, preferably such that they do not substantially interfere with the desired optical or other properties of the resulting product. In some exemplary embodiments, one or more additional layers 20, 24, 28 may be or may include diffusers, such as a rough, matte or structured surface, a beaded diffuser or a diffuser including organic and/or inorganic particles, or any number or combination thereof. The functional components listed above may also be incorporated into polydiorganosiloxane polyamide block copolymer layers 12, 14 provided such incorporation does not adversely affect any of the optical requirements for the layer(s) to an undesirable extent.

Skin layers 20, 24 may also be used to impart or improve scratch and abrasion resistance in the resulting composite film 10, 22. Polydiorganosiloxane polyamide block copolymers used in skin layers 20, 24 are inherently scratch and abrasion resistant because of their high resilience. In another exemplary embodiment, a skin layer 20, 24 comprising particles of silica embedded in the polydiorganosiloxane polyamide block copolymer matrix may be used.

Layers 20, 24, 28 made of polydiorganosiloxane polyamide block copolymers also impart or improve puncture and/or tear resistance in the resulting composite film 10, 22, 26. Adhering these layers to composite film 10, 22, 26 during the manufacturing process, such as by a coextrusion process, provides the advantage that composite film 10, 22, 26 is protected during the manufacturing process.

In one example, additional layer 20, 24, 28 includes a dye or pigment that absorbs in one or more selected regions of the spectrum. Exemplary selected regions can include portions or all of the visible spectrum as well as ultraviolet and infrared. If all of the visible spectrum is absorbed, the layer will appear opaque. Additives for layers 20, 24, 28 can be selected in order to change the apparent color of light transmitted or reflected by composite film 10, 22, 26. They can also be used to compliment the properties of the film, particularly where the film transmits some light frequencies while reflecting others. In another embodiment, the use of a UV absorptive material in a skin cover layer 20, 24 is particularly desirable because it may be used to protect inner layers 16 that may sometimes be unstable when exposed to UV radiation. In one embodiment, a fluorescent material is incorporated into layer 20, 24, 28. Fluorescent materials absorb electromagnetic energy in the ultraviolet region of the spectrum and reemit in the visible.

The polydiorganosiloxane polyamides of layers 20, 24, 28 can be formulated into adhesive compositions such as pressure sensitive adhesives and heat activated adhesives that contain a tackifier. Such adhesive compositions comprising polydiorganosiloxane polyoxamides are further described in U.S. patent application Ser. No. 11/317,602, filed on Dec. 23, 2005, incorporated herein by reference in its entirety. Because polydiorganosiloxane polyamide block copolymers provide a superior bonding surface compared to materials such as polyester, they can be used in one exemplary embodiment as a skin tie layer 20, 24 to promote adhesion between film 16 and another film (including, for example, a curable resin layer) to produce a composite film. In another exemplary embodiment, the polydiorganosiloxane polyamide block copolymers are applied as adhesive skin layers 20, 24 in cases where composite film 10, 22 is intended for later lamination to another material, such as a glass or metal substrate.

Because polydiorganosiloxane polyamide block copolymers have such a low refractive index, their use as skin layer 20, 24 reduces or minimizes reflection losses at film surface 13, 15 thus reducing glare and improving optical performance.

Many of the advantages derived from skin layers 20, 24 can also be derived from an analogous internal layer 28 of composite film 26, such as that shown in FIG. 3. Thus, the foregoing discussion regarding skin layers 20, 24 is also applicable to internal layer 28. Moreover, while one internal layer 28 is illustrated, it is contemplated that numerous internal layers 28 may be used in a composite film 26 in accordance with the present disclosure. Moreover, though each film layer 30 is illustrated as a multilayer element in FIG. 3, in another embodiment, each film layer 30 is a monolithic film.

In some exemplary embodiments, the composite film 10 may include an absorbing or dichroic polarizer layer, as described, for example, in U.S. Pat. No. 6,096,375 to Ouderkirk et al., entitled "Optical Polarizer," incorporated herein by reference. The skin layer 20, 24 may be or may include an absorbing polarizer or the absorbing polarizer may be disposed over the skin layer 20, 24. In some such configurations, the transmission axis of the dichroic polarizer is aligned with the transmission axis of a reflective polarizer.

Test Methods
Hardness Testing

Shore A Hardness was measured according to ASTM D2240-5 Standard Test Method for Rubber Property—Durometer Hardness. This test method is based on the penetration of a specific type of indentor when forced into the material under specified conditions. The indentation hardness is inversely related to the penetration and is dependent on the elastic modulus and viscoelastic behavior of the material.

90° Peel Delamination Test Method

A multilayer film (or cast web) to be tested was cut into a 25.4 mm wide strip specimen. The film strip specimen was adhered to a glass substrate (about 50 mm×150 mm) using a double sided adhesive tape with identical width (Trade name Scotch #396, 3M Co., St. Paul, Minn.). The adhesive tape is dispensed directly atop the entire multilayer film strip specimen and also adhered to the center portion of the glass substrate. Also, a short length of the tape strip, at the end of the tape strip which is adhered to the additional length of the substrate, was left dangling, unadhered, so it could be gripped by hand. Peel (delamination) of the film was initiated by a sharp, quick pull on this free end of the tape strip, with one's thumb firmly placed ¼ from the leading edge of the film strip specimen, to prevent peeling too much of the film strip specimen. The peel-initiated plaque was then loaded in a Slip/Peel Tester (Instrumentors, Inc., Strongsville, Ohio). The portion of the film strip specimen adhering to the tape strip was peeled away from the substrate at a 90° peel angle, at 2.54 cm/second, at 25° C. and 50% relative humidity. The average delamination force in g/in of 5 peels was recorded.

Titration Method to Determine Equivalent Weight

Approximately 10 grams (precisely weighed) of the precursor compound of Formula II was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N (or 0.1N) hydrochloric acid. The number of equivalents of precursor was equal to the number of equivalents of N-hexylamine added to the sample minus the number of equivalents of hydrochloric acid added during titration. The equivalent weight (grams/equivalent) was equal to the sample weight of the precursor divided by the number of equivalents of the precursor.

Inherent Viscosity (IV) for Polydiorganosiloxane Polyoxamide Block Copolymer

Average inherent viscosities (IV) were measured at 30° C. using a Canon-Fenske viscometer (Model No. 50 P296) in a tetrahydrofuran (THF) solution at 30° C. at a concentration of 0.2 g/dL. Inherent viscosities of the materials of the invention were found to be essentially independent of concentration in the range of 0.1 to 0.4 g/dL. The average inherent viscosities were averaged over 3 or more runs. Any variations for determining average inherent viscosities are set forth in specific Examples.

An exemplary composite film 26 is described in the following examples:

Example 1

A polydiorganosiloxane polyoxamide block copolymer, silicone polyamide polymer, was prepared as follows: 10.00 grams of 5 k silicone diamine (a polydimethylsiloxane diamine with MW=5200; 1.0 eq; 0.0019 mole diamine that was prepared as described in U.S. Pat. No. 5,214,119, incorporated by reference) was degassed in a round bottomed flask with a heat gun and aspirator. 44.8 grams of tetrahydrofuran (THF) was then added. Next, 0.9773 grams of trifluoroethyl oxalate (MW=254.09; 2.0 eq; 0.0038 mole) was dripped into the mixture under ambient conditions. 0.2235 g of distilled hexamethylene diamine (MW=116.21; 1.0 eq; 0.0019 mole) was diluted in 1 ml of THF; this mixture was added to the flask at a rather fast steady drip with a pipette. The mixture was stirred under ambient conditions for several minutes. The reaction was then sampled and verified that the reaction had progressed to a high level of polymerization. A sample was cast out and upon drying produced a clear, strong elastomeric film.

A portion of this sample was dissolved in a solvent blend of 50 wt % methyl ethyl ketone and 50 wt % isopropanol at a level of 50 wt % solids.

A PET/silicone polyamide/PET film 26 was constructed as follows:

1) Two 4"×4" pieces of 30 mil cast web PET film 30 were cut to size.

2) Next, a paintbrush was utilized to apply the 50% solids methyl ethyl ketone/isopropanol blend solution of silicone polyamide polymer to one side of each of the cast web PET films. These coated films were allowed to air dry.

3) The coated sides of the cast web films were placed in contact with each other and placed in a 5000 psi press at 200° F. (93° C.) for 30 seconds.

4) This pressed sample was then clamped into an 85° C. laboratory biaxial film stretcher. The film was then heated for 30 seconds at 95° C. and stretched at 20%/sec to a balanced biaxial 3:1 stretch ratio.

Upon removal from the stretcher, the sample visually exhibited excellent spreading (continuous layer of uniform thickness) of the silicone polyamide between the PET film layers. Additionally, the silicone polyamide/PET interfaces proved to have significant adhesive strength.

Example 2

Diethyl oxalate (241.10 grams) was placed in a 3 liter, 3-neck resin flask equipped with a mechanical stirrer, heating mantle, nitrogen inlet tube (with stopcock), and an outlet tube. The flask was purged with nitrogen for 15 minutes and 5 k PDMS diamine (a polydimethylsiloxane diamine with an average molecular weight of about 5,000 g/mole that was prepared as described in U.S. Pat. No. 5,214,119, incorporated by reference) (2,028.40 grams, MW=4,918) was added slowly with stirring. After 8 hours at room temperature, the reaction flask was fitted with a distillation adaptor and receiver, the contents stirred and heated to 150° C. under vacuum (1 Torr) for 4 hours, until no further distillate was able to be collected. The remaining liquid was cooled to room temperature to provide 2,573 grams of oxamido ester terminated product. Gas chromatographic analysis of the clear, mobile liquid showed that no detectable level of diethyl oxalate remained. Molecular weight was determined by $^1$H NMR (MW=5,477 grams/mole) and titration (Equivalent weights of 2,573 grams/mole and 2,578 grams/mole).

793.20 g of 5 k ethyl oxalylamidopropyl terminated polydimethyl siloxane prepared as described above was placed into a 3 liter, 3-neck resin flask equipped with a mechanical stirrer, heating mantle, nitrogen inlet tube (with stopcock), and an outlet tube. The flask was purged with nitrogen for 15 minutes and hexane diamine (17.48 grams) was added. The mixture was mechanically stirred and heated to 150° C. under a nitrogen atmosphere for 3.5 hours. The viscous molten product was poured into a glass tray and allowed to cool to provide the silicone polyoxamide product as a clear, strong elastomeric slab having a Shore A hardness of 59. This slab of polydiorganosiloxane polyoxamide block copolymer resin was then ground into fine pellets.

This polydiorganosiloxane polyoxamide block copolymer resin was then incorporated into a 3-layer film through a process of co-extrusion. This extrusion was carried out as follows: A 1.5" Davis-Standard single-screw extruder utilized dried standard PET resin (0.60 IV) known as DMT clear (available from 3M corporation) to feed the bottom (chill roll side) layer of a three layer die/feedblock. A 25 mm Berstorff twin-screw extruded was used to feed the middle layer of the die and polydiorganosiloxane polyoxamide block copolymer resin was fed into this extruder. A 1" Davis-Standard single-screw extruder utilized dried standard PET resin (0.60 IV) known as DMT clear (available from 3M corporation) to feed the top layer of a three layer die. An extrusion processing temperature of about 530° F. (277° C.) was chosen for PET and polydiorganosiloxane polyoxamide block copolymer materials. A 6 inch (15.2 cm) wide extrudate was quenched on a chill roll and 30 mil (0.76 mm) cast web was collected. As noted earlier in this document, excellent film formation and interlayer adhesion were achieved according to the 90° C. Peel Delamination Test Method.

Example 3

Into a 20° C. 2 gallon stainless steel reaction vessel, 3675.4 grams of 5 k ethyl oxalylamidopropyl terminated polydimethyl siloxane (titrated MW=6174), which was prepared in a fashion similar to the description in the previous example, was placed. The vessel was subjected to agitation (80 rpm), and purged with nitrogen flow and vacuum for 15 minutes. The kettle was then nitrogen pressurized to 5 psig and heated to 90° C. over the course of 25 minutes. 81.08 grams of meta-Xylylene Diamine (available from TCI America) was then added to the kettle, followed by 80 grams of toluene. The kettle was then heated to a temperature of 105° C. After 65 minutes at 105° C., pressure on the kettle was slowly vented over the course of 5 minutes. The kettle was then subjected to vacuum (~20 mmHg) for one hour to remove the ethanol and toluene. The kettle was then repressured to 2 psig and the viscous molten polymer was then drained into a Teflon coated tray and allowed to cool. The cooled silicone polyoxamide product, polydiorganosiloxane polyoxamide block copolymer, was then ground into fine pellets. The IV of this material was determined to be 0.853 dL/g (in THF).

This polydiorganosiloxane polyoxamide block copolymer resin was then incorporated into a 61-layer film through the process of co-extrusion. This extrusion was carried out as follows:

Into a 1.5" Davis-Standard single-screw extruder and necktube Invista 8602 PET resin (available from Invista of Charlotte, N.C.) was fed. This extrusion train supplied material to the 31 alternating 'A' layers of a 61 layer feedblock and die. Into a 25 mm Berstorff twin-screw extruded with an associated necktube and gear pump the above described silicone polyoxamide polydiorganosiloxane polyoxamide block copolymer material was fed. This extrusion train supplied material to the 30 alternating 'B' layers of the 61 layer feedblock and die.

A melt processing temperature of about 540° F. (282° C.) was utilized for the PET extrusion train, while the polydiorganosiloxane polyoxamide block copolymer extrusion line was heated to a temperature of 450° F. (232° C.). The 61 layer feedblock and die were heated to a temperature of 530° F. (277° C.).

A 6 inch (15.2 cm) wide extrudate was quenched on a chill roll and 22 mil cast web was collected. The resulting 61-layer cast web was tested for delamination strength using the 90° Peel Delamination Test Method. Excellent interlayer adhesion was verified. Excellent film formation and interlayer adhesion were achieved. Optical micrographs of the cast web sample were taken to verify distinct layer formation.

A portion of the cast web sample was cut into a 4"×4" square and then clamped into an 85° C. laboratory biaxial film stretcher. The film was heated for 30 seconds at 95° C. and stretched at 20%/sec in a balanced biaxial 3:1 stretch ratio. The stretched 61-layer film was tested for delamination strength using the 90° Peel Delamination Test Method. Excellent interlayer adhesion was verified.

Example 4

Into a 20° C. 10 gallon stainless steel reaction vessel, 18158.4 grams of 14 k ethyl oxalylamidopropyl terminated polydimethyl siloxane (titrated MW=14,890), which was prepared in a fashion similar to the description in the previous example, was placed. The vessel was subjected to agitation (75 rpm), and purged with nitrogen flow and vacuum for 15 minutes. The kettle was then heated to 80° C. over the course of 25 minutes. 73.29 grams of ethylene diamine (GFS Chemicals) were vacuum charged into the kettle, followed by 73.29 grams of toluene (also vacuum charged). The kettle was then pressurized to 1 psig and heated to a temperature of 120° C. After 30 minutes, the kettle was heated to 150° C. Once a temperature of 150° C. was reached, the kettle was vented over the course of 5 minutes. The kettle was subjected to vacuum (~65 mmHg) for 40 minutes to remove the ethanol and toluene. The kettle was then pressured to 2 psig and the viscous molten polymer was then drained into Teflon coated trays and allowed to cool. The cooled silicone polyoxamide product, polydiorganosiloxane polyoxamide block copolymer, was then ground into fine pellets. The IV of this material was determined to be 0.829 dL/g (in THF).

This polydiorganosiloxane polyoxamide block copolymer resin was then incorporated into a 61-layer film through the process of co-extrusion. This extrusion was carried out as follows:

Into a 1.5" Davis-Standard single-screw extruder and necktube Invista 8602 PET resin (available from Invista of Charlotte, N.C.) was fed. This extrusion train supplied material to the 31 alternating 'A' layers of a 61 layer feedblock and die. Into a 25 mm Berstorff twin-screw extruded with an associated necktube and gear pump the above described silicone polyoxamide polydiorganosiloxane polyoxamide block copolymer material was fed. This extrusion train supplied material to the 30 alternating 'B' layers of the 61 layer feedblock and die.

A melt processing temperature of about 540° F. (282° C.) was utilized for the PET extrusion train, the polydiorganosiloxane polyoxamide block copolymer extrusion train, and the 61 layer feedblock and die.

A 6 inch (15.2 cm) wide extrudate was quenched on a chill roll and 22 mil cast web was collected. The resulting 61-layer cast web was tested for delamination strength using the 90° Peel Delamination Test Method. Excellent interlayer adhesion was verified. Excellent film formation and interlayer adhesion was achieved. Optical micrographs of the cast web sample were taken to verify distinct layer formation. The stretched 61-layer film was tested for delamination strength using the 90° Peel Delamination Test Method. Excellent interlayer adhesion was verified.

A portion of the cast web sample was cut into a 4"×4" square and then clamped into an 85° C. laboratory biaxial film stretcher. The film was heated for 30 seconds at 95° C. and stretched at 20%/sec in a balanced biaxial 3:1 stretch ratio.

Example 5

To a solution of 152.2 parts of methyl salicylate and 101.2 parts triethylamine in toluene (30%) was added dropwise with stirring a 40% solution of 91.5 parts of adipoyl chloride in toluene. An immediate precipitate of triethylamine hydrochloride formed. Stirring was continued for 1 hour after addition was complete. The mixture was filtered, and the filtrate was evaporated to dryness in a rotary evaporator to provide a white crystalline solid. The product, the di-methyl salicylate of adipic acid, was isolated by slurrying in hexane and filtering and dried in an oven. The product was pure by TLC and NMR spectrum.

A 30% by weight solution of 526.0 parts of a 5260 MW polydimethylsiloxane diamine (prepared as described in U.S. Pat. No. 5,214,119, incorporated herein by reference) and 11.6 parts of hexamethylene diamine in isopropyl alcohol was prepared. A 30% by weight solution in isopropyl alcohol of 82.9 parts of the methyl salicylate adipate ester (prepared as above) was prepared and this solution was added suddenly to the first solution. The clear solution was stirred at room temperature overnight during which time the viscosity of the solution rose significantly. The solution was cast into a glass tray, the solvent allowed to evaporate over several hours, and dried completely in an oven at 70 degrees C. overnight to provide a clear, strong elastomeric film, silicone polyadipamide.

The silicone polyadipamide was dissolved in a 50 wt % methyl ethyl ketone/50 wt % isopropanol blend at 10 wt % solids. This solution was coated out onto an unprimed oriented polyester film (Scotchpar 2 mil PET film available from 3M company) using a #12 Meyer rod, leaving an uncoated margin all around the coated area. The sample was allowed to dry. Coating appearance of the dried silicone polyadipamide was excellent. The polymer coating could not be removed from the film. The coated PET film was then folded over onto itself, with the coated side comprising the inside of the folded film. This specimen was placed in a 210° C. press at 2000 PSI for 30 seconds. Upon removal from the press, the specimen was grasped by hand by the uncoated margins of the PET substrate film, and pulled apart. Failure occurred cohesively within the silicone polyadipamide layer and the silicone polyadipamide layer was not removed from either of the PET surfaces.

Although the present invention has been described with reference to preferred embodiments, those of skill in the art will recognize that changes may be made in form and detail without departing from the spirit and scope of the present disclosure.

The invention claimed is:

1. A composite film comprising:
   a first film comprising at least one of a multilayer reflective optical film and a continuous/disperse phase reflective optical film; and
   a second film contiguous to said first film, the second film comprising a polymeric material comprising at least 2 repeat units of Formula I:

I wherein each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN\text{-}G\text{-}NHR^3$ minus the two $-NHR^3$ groups;
$R^3$ is hydrogen, alkyl, or taken together with G and to the nitrogen to which they are both attached form a heterocyclic group;
n is independently an integer of 0 to 1500;
each B is independently a covalent bond, an alkylene of 4-20 carbons, an aralkylene, an arylene, or a combination thereof; and
p is an integer of 1 to 10.

2. The film of claim 1 wherein each B is a covalent bond.

3. The composite film of claim 1 wherein the first film comprises a material selected from the group consisting of polyalkylene naphthalates, isomers of polyalkylene naphthalates, and copolymers of polyalkylene naphthalates.

4. The composite film of claim 1 wherein the first film comprises a material selected from the group consisting of polyalkylene terephthalates and copolymers of polyalkylene terephthalates.

5. The composite film of claim 1 wherein the second film includes one or more materials selected from the group consisting of antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners.

6. The composite film of claim 1 wherein the first film comprises a plurality of layers.

7. The composite film of claim 1 further comprising a third film, wherein the second film is disposed between the first film and the third film.

8. The composite film of claim 7 wherein the third film comprises a plurality of layers.

9. A composite film comprising:
   a first film comprising at least one of a multilayer reflective optical film and a continuous/disperse phase reflective optical film; and a second film contiguous to said first film, the second film comprising a polydiorganosiloxane polyoxamide block copolymer.

10. The composite film of claim 9, wherein the second film comprises a polydiorganosiloxane polyoxamide block copolymer.

11. The composite film of claim 9 wherein the light transmissive material is selected from the group consisting of polyalkylene naphthalates, isomers of polyalkylene naphthalates, and copolymers of polyalkylene naphthalates.

12. The composite film of claim 9 wherein the light transmissive material is selected from the group consisting of polyalkylene terephthalates and copolymers of polyalkylene terephthalates.

13. The composite film of claim 9 wherein the second film includes one or more materials selected from the group consisting of antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners.

14. The composite film of claim 9 wherein the first film comprises a plurality of layers.

15. The composite film of claim 9 further comprising a third film, wherein the second film is disposed between the first film and the third film.

16. The composite film of claim 14 wherein the third film comprises a plurality of layers.

17. A composite film comprising:
   a first film comprising a material selected from the group consisting of polyalkylene naphthalates, isomers of polyalkylene naphthalates, and copolymers of polyalkylene naphthalates; and
   a second film contiguous to said first film, the second film comprising a polymeric material comprising at least 2 repeat units of Formula I:

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN$-G-$NHR^3$ minus the two —$NHR^3$ groups;

$R^3$ is hydrogen, alkyl, or taken together with G and to the nitrogen to which they are both attached form a heterocyclic group;

n is independently an integer of 0 to 1500;

each B is independently a covalent bond, an alkylene of 4-20 carbons, an aralkylene, an arylene, or a combination thereof; and p is an integer of 1 to 10.

18. A composite film comprising:
a first film comprising a birefringent light transmissive material, wherein the light transmissive material is selected from the group consisting of polyalkylene naphthalates, isomers of polyalkylene naphthalates, and copolymers of polyalkylene naphthalates; and
a second film contiguous to said first film, the second film comprising a polydiorganosiloxane polyamide block copolymer.

* * * * *

UNITED STATES PATENT AND TRADEMARK OFFICE
CERTIFICATE OF CORRECTION

| | | |
|---|---|---|
| PATENT NO. | : 8,067,094 B2 | |
| APPLICATION NO. | : 11/614357 | |
| DATED | : November 29, 2011 | |
| INVENTOR(S) | : Karl E Benson | |

It is certified that error appears in the above-identified patent and that said Letters Patent is hereby corrected as shown below:

Column 2
Line 61, After "and" insert -- a copending application with Attorney Docket No. 61494US003 --.

Column 4
Line 54, Delete "dimethanel" and insert -- dimethanol --, therefor.

Column 5
Line 9, Before "U.S." insert -- copending --.

Column 10
Line 56, Delete "polyxamide" and insert -- polyoxamide --, therefor.

Column 11
Line 56, Before "U.S." insert -- copending --.

Column 12
Line 47, Delete "¼" and insert -- ¼" --, therefor.

Column 18
Line 25, Claim 9, Delete "polyoxamide" and insert -- polyamide --, therefor.
Line 30, Claim 11, Delete "light transmissive material is" and insert -- first film comprises a material --, therefor.
Line 34, Claim 12, Delete "light transmissive material is" and insert -- first film comprises a material --, therefor.

Signed and Sealed this
Twenty-eighth Day of August, 2012

David J. Kappos
*Director of the United States Patent and Trademark Office*